United States Patent [19]

Fritz, Jr.

[11] Patent Number: 4,698,874
[45] Date of Patent: Oct. 13, 1987

[54] WINDSHIELD WIPER BLADE

[76] Inventor: Charles T. Fritz, Jr., One Colin Ct., Claymont, Del. 19703

[21] Appl. No.: 870,921

[22] Filed: Jun. 5, 1986

[51] Int. Cl.⁴ .............................................. B60S 1/38
[52] U.S. Cl. .............................. 15/250.33; 15/250.36; 15/250.42
[58] Field of Search ........................ 15/250.33–250.36, 15/250.42

[56] References Cited

U.S. PATENT DOCUMENTS 2,915,769 12/1959 Ryck ................................ 15/250.33

FOREIGN PATENT DOCUMENTS 138048 10/1981 Japan ................................. 15/250.36
710360 6/1954 United Kingdom ............. 15/250.36
2093339 9/1982 United Kingdom ............. 15/250.36

Primary Examiner—Peter Feldman
Attorney, Agent, or Firm—Lyman R. Lyon

[57] ABSTRACT

A dual durometer windshield wiper blade assembly comprises an elongated elastomeric wiper blade with an integral squeegee rib of relatively low durometer material. The blade has an integral hinge of circular cross-section coextensive with the squeegee rib and of a relatively high durometer. A high durometer plastic elastomeric blade holder supports the wiper blade at angularly spaced positions upon reciprocation of said assembly.

2 Claims, 3 Drawing Figures

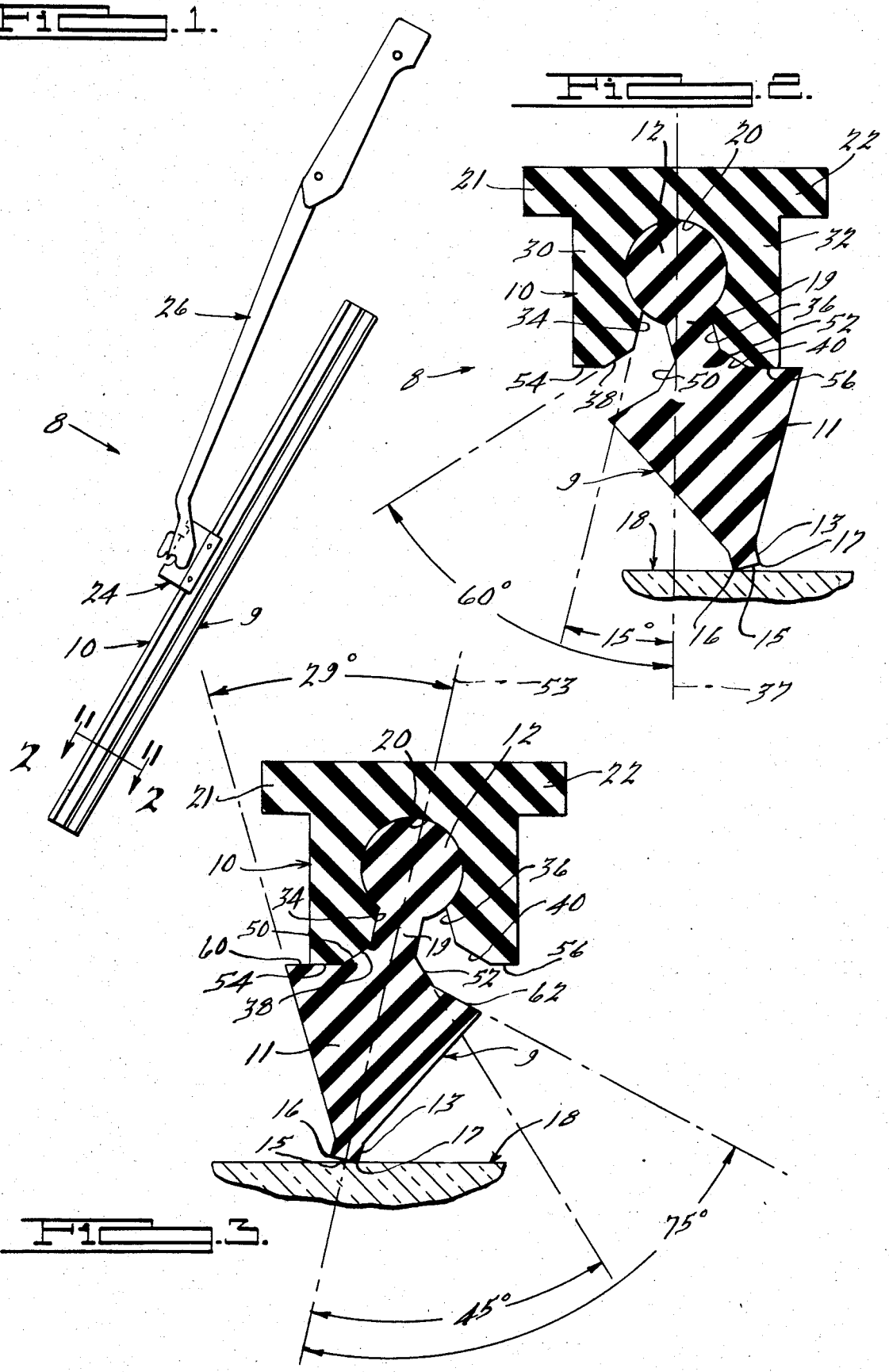

WINDSHIELD WIPER BLADE

BACKGROUND OF THE INVENTION

Windshield wiper blades are required to operate in an environment subject to snow, sleet, oil, insects, tree sap, dirt and other foreign matter, yet have an extended useful life to avoid frequent replacement. Prior attempts to improve wiper blade performance by providing special contours to the cross-section of the blade or by selection of blade material have not fully solved the problem of extended wiper blade life. For example, U.S. Pat. No. 4,473,919, and U.S. Pat. No. 2,179,451 teach a hinged squeegee blade but an intermediate portion of the blade wiper between an attach or pivot point and the squeegee rib is designed to flex. I have determined that blade performance and life are materially improved by rigidifying the connecting portion between the attach or hinge point and squeegee rib of the wiper blade whereby the angular position of the blade is positively controlled, and flexure is substantially eliminated. A low durometer edge of a squeegee rib is subjected primarily to compression as opposed to flexure.

SUMMARY OF THE INVENTION

An elastomeric dual durometer blade has a rigid portion pivotably supported in a complimentary full length high durometer blade holder. The blade has a relatively low durometer squeegee rib that presents one of a pair of contact edges to a windshield during each wiping stroke while a non-flexing high durometer body portion of the blade pivots in the blade holder.

BRIEF DESCRIPTION OF THE DRAWING

FIG. 1 is an elevational view of a complete wiper assembly;

FIG. 2 is a cross-sectional view taken along the line 2—2 of FIG. 1; and

FIG. 3 is a view similar to FIG. 2 of the wiper blade at an opposite rotational position.

DETAILED DESCRIPTION OF THE PREFERRED EMBODIMENT OF THE INVENTION

A wiper assembly 8 in accordance with a constructed embodiment of the instant invention comprises an extruded dual durometer thermoplastic blade 9 adapted to be pivotly accepted in a complimentary coextensive blade holder 10. The blade 9 comprises a wiping portion 11 of triangular cross-section and a hinge portion 12 of circular cross-section. The wiping portion 11 of the blade 9 has a squeegee rib 13 of relatively low durometer, for example, 50-55 on the Shore A scale. The squeegee rib 13 is provided with an end face 15 that defines relatively sharp squeegee edges 16 and 17 that are presented to a surface of, for example, an automotive windshield 18. The wiper portion 11 of the blade 9 is connected to the hinge portion 12 by an intermediate portion 19 both of which are of relatively high durometer, for example 70-80 on the Shore A scale. The circular hinge portion 12 of the blade 9 is accepted in a complimentary circular channel 20 in the blade holder 10.

The blade holder 10 is of relatively high durometer material, for example, Lexan polycarbonate and is of channel shape cross-section having oppositely facing outer edge portions 21 and 22 for acceptance in a wiper arm clip 24 of conventional configuration. The clip 24 is engageable with an arm 26 in the conventional manner.

In accordance with an important feature of the instant invention, the relatively rigid intermediate or connecting portion 19 of the blade 11 is stabilized against flexure by the configuration of the blade holder 10. More specifically, the blade holder 10 has leg portions 30 and 32 on opposite sides of the circular channel 20 therein with angular faces 34 and 36 respectively, which extend at an angle of 15 degrees, respectively, to a plane 37 (FIG. 2) that extends parallel to the legs 30 and 32 thereby defining an included angle of 30 degrees between the faces 34 and 36. The faces of 34 and 36 terminate in intermediate faces 38 and 40, that extend at angles of 60 degrees, respectively, to the plane 37 thereby defining an included angle of 120 degrees between the faces 38 and 40.

The blade 9 has faces 50 and 52 between the intermediate portion 19 and the wiper portion 11 thereof which, in conjunction with the connecting portion 19 thereof are complimentary to the faces 34-36 and 38-40 of the blade holder 10 thereby to accomplish a nesting action at opposite angular positions of the blade 9 relative to the holder 10. The faces 50 and 52 extend at an angle of 45 degrees, respectively, to a plane 53 (FIG. 3) that extends through the squeegee rib 13 and the central axis of the circular hinge portion 12 of the blade 9. A pair of lower end faces 54 and 56 on the legs 30 and 32 of the blade holder 10 extend at a right angle to the plane 37 for engagement of a pair of faces 60 and 62 on the wiping portion 11 of the blade 9 which extend at an angle of 75 degrees to the plane 53.

From the foregoing description, it should be apparent that the high durometer portions of the blade 9 nests with either the leg 30 or the leg 32 of the high durometer blade holder 10 at alternate angular positions due to movement of the blade holder 10 in opposite directions. Stated in another manner, the angular nesting relationship of the blade 9 in the supporting blade holder 10 stiffens the blade 9 and precludes flexure thereof incident to reciprocation of the wiper assembly 8. Since the squeegee tip 13 is of relatively low durometer, efficient wiping edges 16 and 17 are alternately presented to the windshield 18 in substantially pure compression, while rotation of the blade 9 is positively controlled against flexure by the nesting high durometer portions of the blade 9 and the blade holder 10.

I claim:

1. A windshield wiper blade assembly comprising
an elongated dual durometer elastomeric wiper blade having an integral longitudinally extending squeegee rib of relatively low durometer material,
said blade having an integral hinge portion of circular cross section coextensive with and spaced from said squeegee rib and of a relatively high durometer,
said blade having an intermediate portion between the squeegee rib and hinge portion thereof of relatively high durometer and having a plurality of angularly related blade surfaces on opposite sides thereof, and
a high durometer plastic elastomeric blade holder of generally U-shaped cross section comprising a bight portion and spaced leg portions defining a circular channel between the leg portions complementary to and defining an axis of rotation for the hinge portion of said blade for the pivotal support thereof, each of said leg portions having a plurality of holder surfaces angularly related to one another and complementary to the blade surface on said blade so as to be engageable therewith in juxtaposed interlocking relationship so as to position and support said wiper blade against flexure at two angularly related positions, alternately, upon reciprocation of said blade about the axis of rotation of the hinge portion thereof.

2. A wiper blade assembly in accordance with claim 1 wherein the hinge and intermediate portions of said blade are of thermoplastic material of 70–80 durometer on the Shore A scale and the squeegee rib is of like material but of 50–55 durometer.

* * * * *